United States Patent
Avins et al.

(10) Patent No.: US 12,156,606 B2
(45) Date of Patent: *Dec. 3, 2024

(54) RAPID AND/OR MULTIPLE EXTRACTION BREWING PROCESSES

(71) Applicant: Voga Coffee, Inc., Wyomissing, PA (US)

(72) Inventors: Joshua Lewis Avins, San Francisco, CA (US); Eli Salomon, San Francisco, CA (US)

(73) Assignee: Voga Coffee, Inc., Wyomissing, PA (US)

( * ) Notice: Subject to any disclaimer, the term of this patent is extended or adjusted under 35 U.S.C. 154(b) by 586 days.

This patent is subject to a terminal disclaimer.

(21) Appl. No.: 17/399,673

(22) Filed: Aug. 11, 2021

(65) Prior Publication Data
US 2022/0104650 A1 Apr. 7, 2022

Related U.S. Application Data

(63) Continuation of application No. 16/751,090, filed on Jan. 23, 2020, now Pat. No. 11,116,351, which is a (Continued)

(51) Int. Cl.
*A47J 31/00* (2006.01)
*A23F 5/26* (2006.01)
(Continued)

(52) U.S. Cl.
CPC ............... *A47J 31/002* (2013.01); *A23F 5/26* (2013.01); *A23F 5/262* (2013.01); *A47J 31/02* (2013.01);
(Continued)

(58) Field of Classification Search
CPC .......... A47J 31/002; A47J 31/02; A47J 31/10; A47J 31/44; A47J 31/0663; A47J 31/3671; A23F 5/26; A23F 5/262
See application file for complete search history.

(56) References Cited

U.S. PATENT DOCUMENTS

| 2,223,450 A | 12/1940 | Jepson |
| 2,550,513 A | 4/1951 | Young |

(Continued)

FOREIGN PATENT DOCUMENTS

| CN | 1235490 | 1/2006 |
| CN | 201046357 | 4/2008 |

(Continued)

OTHER PUBLICATIONS

"Pressure Brewed Coffee—Extraction Curves," http://www.espressoplanet.com/espresso-coffee-machine/pressure_brewed_coffee_extraction.html, accessed Dec. 10, 2014, 4 pages.

(Continued)

*Primary Examiner* — Anthony J Weier
(74) *Attorney, Agent, or Firm* — Perkins Coie LLP

(57) ABSTRACT

Coffee makers with features for rapid and/or multiple extraction processes, and associated systems and methods, are included. A representative method for brewing coffee includes placing ground coffee on a filter element of a brew chamber, directing heated water into the brew chamber and in contact with the ground coffee and, during a first phase, brewing coffee in the brew chamber without subjecting the coffee to a pressure differential of at least 150 torr between the brew chamber and a coffee chamber to which the brew chamber is coupled, the coffee chamber having a capacity of 200 mL or more. The representative method further includes, during a second phase, extracting the coffee from the brew chamber through the filter element and into the coffee chamber via a pressure differential of at least 150 torr between the brew chamber and the coffee chamber.

22 Claims, 10 Drawing Sheets

Related U.S. Application Data continuation of application No. 15/940,480, filed on Mar. 29, 2018, now Pat. No. 10,674,856, which is a continuation of application No. 14/594,970, filed on Jan. 12, 2015, now Pat. No. 9,962,030.

(51) Int. Cl.

| | | |
|---|---|---|
| *A47J 31/02* | (2006.01) | |
| *A47J 31/06* | (2006.01) | |
| *A47J 31/10* | (2006.01) | |
| *A47J 31/36* | (2006.01) | |
| *A47J 31/44* | (2006.01) | |

(52) U.S. Cl.
CPC .......... *A47J 31/0663* (2013.01); *A47J 31/10* (2013.01); *A47J 31/3671* (2013.01); *A47J 31/44* (2013.01)

(56) References Cited

U.S. PATENT DOCUMENTS

| | | |
|---|---|---|
| 2,660,948 A | 12/1953 | Forschner |
| 2,888,349 A | 5/1959 | Morrow et al. |
| 3,087,415 A | 4/1963 | Kaplan et al. |
| 3,224,360 A | 12/1965 | Wickenberg |
| 3,426,670 A | 2/1969 | Wittern |
| 4,158,067 A | 6/1979 | Wouda |
| 4,277,509 A | 7/1981 | Wouda |
| 4,739,697 A | 4/1988 | Roberts |
| 4,791,859 A | 12/1988 | King |
| 4,967,647 A | 11/1990 | King |
| 5,267,506 A | 12/1993 | Cai |
| 5,479,849 A | 1/1996 | King |
| 5,728,634 A | 3/1998 | Everheart et al. |
| 5,897,903 A | 4/1999 | Gerhard-Rieben |
| 6,391,360 B1 | 5/2002 | Stettes |
| 6,697,903 B2 | 2/2004 | Massie et al. |
| 8,383,180 B2 | 2/2013 | Vastardis et al. |
| 9,962,030 B2 | 5/2018 | Avins |
| 10,674,856 B2 | 6/2020 | Avins |
| 10,863,854 B2 * | 12/2020 | Avins ................ A23F 5/26 |
| 11,116,351 B2 | 9/2021 | Salomon et al. |
| 11,382,451 B2 | 7/2022 | Avins |
| 2006/0032380 A1 | 2/2006 | Klaassen |
| 2008/0280023 A1 | 11/2008 | Kalenian |
| 2010/0199848 A1 | 8/2010 | Lin |
| 2010/0278988 A1 | 11/2010 | Radosav |
| 2011/0097465 A1 | 4/2011 | Bishop |
| 2012/0219686 A1 | 8/2012 | Bombeck |
| 2013/0098240 A1 | 4/2013 | Fidler et al. |
| 2013/0098249 A1 | 4/2013 | Fidler et al. |
| 2013/0136833 A1 | 5/2013 | Vastardis et al. |
| 2013/0220137 A1 | 8/2013 | Bombeck et al. |
| 2014/0034676 A1 | 2/2014 | Verduin et al. |
| 2014/0170280 A1 * | 6/2014 | St. Germain ............ A47J 31/60 |
| | | 426/433 |
| 2016/0007794 A1 * | 1/2016 | Carmichael ............. A23F 5/262 |
| | | 426/433 |
| 2016/0022087 A1 | 1/2016 | Han et al. |
| 2016/0198886 A1 | 7/2016 | Avins |
| 2016/0338522 A1 | 11/2016 | van Schyndel |
| 2017/0055759 A1 | 3/2017 | Radosav |
| 2017/0295992 A1 | 10/2017 | Mangold et al. |
| 2017/0367526 A1 | 12/2017 | Avins |
| 2019/0307283 A1 | 10/2019 | Avins |

FOREIGN PATENT DOCUMENTS

| | | |
|---|---|---|
| CN | 103476303 | 12/2013 |
| CN | 107529776 | 1/2018 |
| WO | WO-0130173 | 5/2001 |

OTHER PUBLICATIONS

Bkon R/A/IN—Revolutionizing the Craft Beverage Industry One Cup at a Time, http://bkonbrew.com/brewing-process/ accessed Oct. 7, 2014, 3 pages.
Bunn—The Science of the Brewing Process, http://www.bunn.com/sites/default/files/brochure/e9000.0078_bunn_coffee_basics_scae.pdf, 2008, 6 pages.
International Search Report and Written Opinion for International Patent Application No. PCT/US16/12910, Applicant: Voge Coffee, Inc., mailed Jun. 20, 2016, 18 pages.
Extended European Search Report and Written Opinion for European Patent Application No. 16737684.7, Applicant: Voga Coffee, Inc., mailed Sep. 10, 2018, 7 pages.
European Extended Search Report and Written Opinion for European Patent Application No. 21206886.0, Applicant: Voga Coffee, Inc., mailed Feb. 4, 2022, 6 pages.

* cited by examiner

RAPID AND/OR MULTIPLE EXTRACTION BREWING PROCESSES

CROSS-REFERENCE TO RELATED APPLICATIONS

This application is a continuation of U.S. patent application Ser. No. 16/751,090, filed Jan. 23, 2020, entitled "COFFEE MAKER WITH FEATURES FOR RAPID AND/OR MULTIPLE EXTRACTION PROCESSES, AND ASSOCIATED SYSTEMS AND METHODS," which is a continuation of U.S. patent application Ser. No. 15/940,480, filed Mar. 29, 2018, entitled "COFFEE MAKER WITH FEATURES FOR RAPID AND/OR MULTIPLE EXTRACTION PROCESSES, AND ASSOCIATED SYSTEMS AND METHODS" (now U.S. Pat. No. 10,674,856), which is a continuation of U.S. patent application Ser. No. 14/594,970, filed Jan. 12, 2015, entitled "COFFEE MAKER WITH FEATURES FOR RAPID AND/OR MULTIPLE EXTRACTION PROCESSES" (now U.S. Pat. No. 9,962,030).

TECHNICAL FIELD

The present technology is directed generally to coffee makers that produce coffee via rapid extractions and/or multiple extractions from a single set of grinds, and associated systems and methods. Results can include flavorful coffee that requires fewer grinds to produce.

BACKGROUND

Coffee has been a commonly-consumed beverage for many years. Over the course of time, many techniques have been developed to brew coffee, with each having its own advantages and disadvantages. For example, siphon coffee brewers were developed in the 1830's and were known to produce flavorful coffee, with little bitterness. However, the siphon brewers typically required a long extraction process, which made them impractical for busy coffee shops. Percolators were initially developed in the 1800's, and became popular in the first half of the twentieth century. Percolators also produce flavorful coffee, unless the brewed coffee is left on high heat for too long a period of time, in which case the coffee can acquire a bitter taste. Percolators have largely been replaced with drip coffee makers, which are simple and produce acceptable coffee. Other representative coffee makers include the Aeropress® and Steam punk coffee maker.

One drawback associated with the foregoing types of coffee makers is that none adequately combine low cost with high speed and efficient use of coffee beans. Consumer demand for flavorful, non-bitter coffee has increased over the past several decades, while the resources required to grow high quality coffee beans have become more scarce, particularly in view of environmental concerns associated with coffee plantations. Accordingly, there remains a need for coffee makers and associated processes that meet the foregoing objectives of low cost, high speed, and high quality.

DETAILED DESCRIPTION

Figure 1:
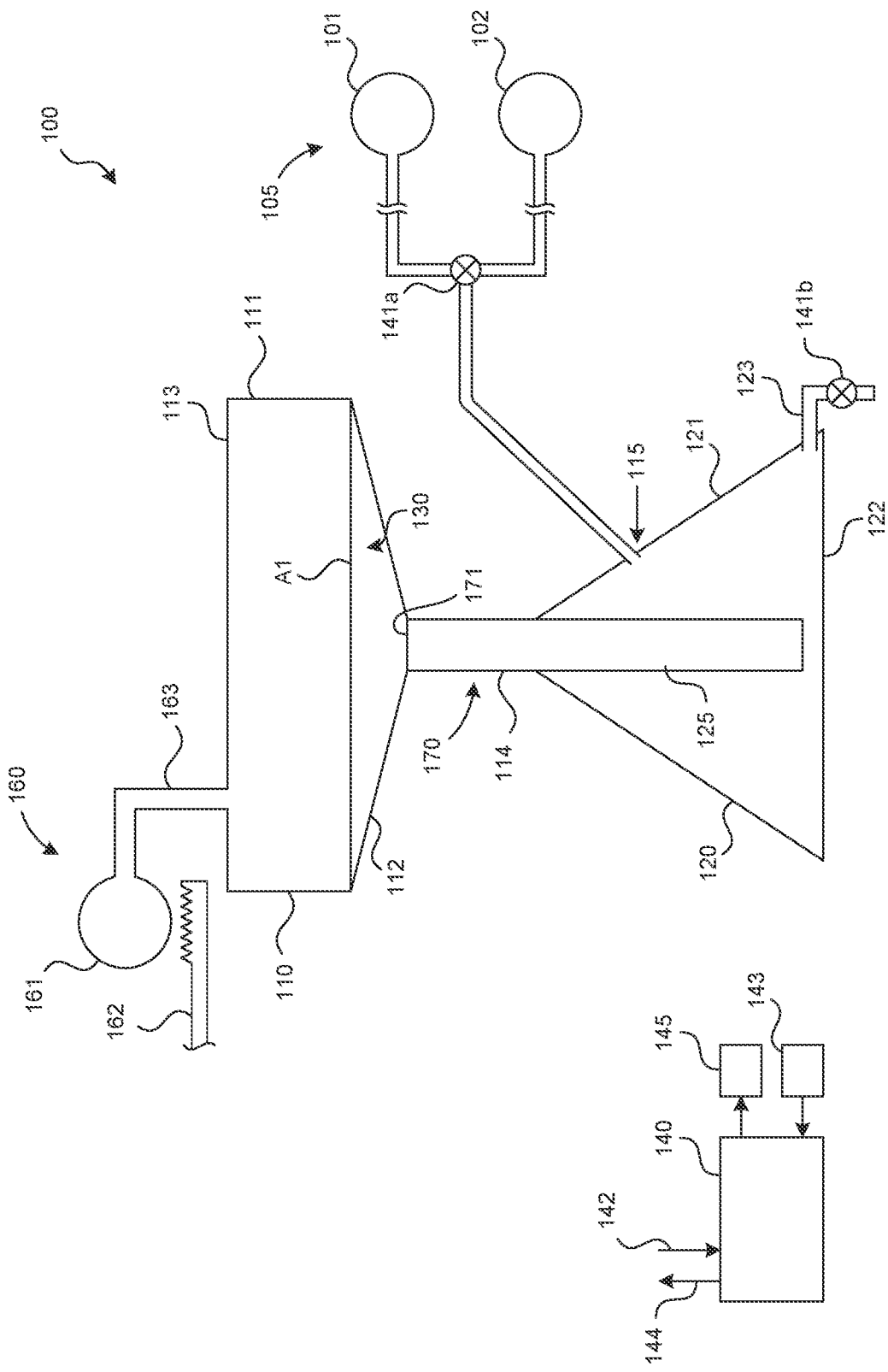
FIG. 1 is a partially schematic, side elevation view of a system for making coffee, configured in accordance with an embodiment of the present technology.

The present technology is directed generally to coffee makers configured to brew coffee via multiple coffee extractions, and/or extractions at relatively high pressure differentials, and associated systems and methods. Such coffee makers can be suitable for residential and/or commercial purposes depending on the particular embodiment. Specific details of several embodiments of the disclosed technology are described below with reference to particular, representative configurations. In other embodiments, the disclosed technology can be practiced in accordance with coffee makers having other configurations. Specific details describing structures or processes that are well-known and often associated with coffee makers, but that may unnecessarily obscure some significant aspects of the presently disclosed technology, are not set forth in the following description for purposes of clarity. Moreover, although the following disclosure sets forth several embodiments of different aspects of the disclosed technology, several other embodiments of the technology can have configurations and/or components different than those described in this section. As such, the present technology may have other embodiments with additional elements, and/or without several of the elements described below with reference to FIGS. 1-10.

Several embodiments of the disclosed technology may take the form of computer-executable instructions, including routines executed by a programmable computer or controller. Those skilled in the relevant art will appreciate that the technology can be practiced on computer or controller systems other than those shown and described below. The technology can be embodied in a special-purpose computer, controller, or data processor that is specifically programmed, configured or constructed to perform one or more of the computer-executable instructions described below. Accordingly, the terms "computer" and "controller" as generally used herein refer to a suitable data processor and can include internet appliances and hand-held devices, including palm-top computers, wearable computers, cellular or mobile phones, multi-processor systems, processor-based or programmable consumer electronics, network computers, mini computers and the like. Information handled by these computers can be presented at any suitable display medium, including a liquid crystal display (LCD).

The present technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including, magnetic or optically readable or removable computer discs, as well as distributed electronically over networks. Data structures and transmissions of data particular to aspects of the technology are also encompassed within the scope of the present technology.

FIG. 1 is a partially schematic, side elevation view of a coffee making system 100 configured to produce coffee via multiple extractions from the same volume or mass of ground coffee. The system 100 can also produce the coffee via relatively high pressure differentials during a coffee extraction process, in addition to or in lieu of producing the coffee via multiple extractions. Accordingly, as will be described in greater detail below, the system 100 can produce flavorful coffee with less ground coffee than is used by conventional techniques and brew systems, and with little or no bitter taste.

As shown in FIG. 1, the system 100 can include a brew chamber 110 for brewing coffee, and an extraction or coffee chamber 120 in which the extracted coffee is collected. Ground coffee beans are placed in the brew chamber 110, as is hot water provided by a boiler 160. During the brewing process, the hot water and coffee grinds may (optionally) be agitated via an agitation device 170 before the coffee is extracted through a filter device 130 into the coffee chamber 120. The agitation device 170 can include an aperture 171 through which a pressurized gas (e.g., air) is directed so as to stir or mix the coffee grinds in the brew chamber 110. The same coffee grinds can be used to brew multiple volumes of extracted coffee, which are collected together in the coffee chamber and dispensed via a coffee outlet 123.

In a particular embodiment, the brew chamber 110 can include one or more side walls 111 (e.g. a continuous circular cylindrical or conical side wall 111), and a lower surface 112 (e.g. a sloped or canted lower surface 112), and can house the filter device 130. The boiler 160 can include (or can be coupled to) a water source 161, and can further include a heat source 162 (for heating the water provided by the water source 161), and a water inlet conduit 163 that directs the heated water into the brew chamber 110. Brewed coffee follows a fluid flow path that passes through the filter device 130, through a chamber connector 114 (that connects the brew chamber 110 to the coffee chamber 120) and into the coffee chamber 120 via an optional flow tube 125.

In a particular embodiment, the filter device 130 encloses an extraction area A1. For example, depending upon the volume of water that the brew chamber 110 is configured to handle, the extraction area A1 can be about 113 in.$^2$ (corresponding to a round filter device 130 having a diameter of 12 inches). In other embodiments, the extraction area A1 can be about 20 in.$^2$ or 38 in.$^2$ (corresponding to filter devices 130 having diameters of about 5 inches, or 7 inches, respectively). In any of these embodiments, the relatively large area A1 allows a given volume of coffee grinds to be spread in a relatively thin layer over the filter device 130. This in turn can increase the speed with which brewed coffee is extracted through the filter device 130, and/or can reduce the likelihood that extended contact between the brewed coffee and the coffee grinds will produce a bitter-tasting coffee.

The system 100 can include a gas port 115 in fluid communication with the coffee chamber 120. In a particular aspect of this embodiment, the gas port 115 can selectively be coupled to a pressure differential device 105 that produces a pressure differential between the brew chamber 110 and the coffee chamber 120. The pressure differential device 105 can include a vacuum source 101 and/or a pressure source 102 coupled to a first valve 141a. The vacuum source 101 is configured to draw a significant negative pressure on the coffee chamber 120, causing the brewed coffee to rapidly pass from the brew chamber 110 through the filter device 130 and into the coffee chamber 120. Accordingly, the vacuum source 101 is a representative example of a pressure differential device 105 that produces a relatively high pressure differential (e.g., at least 60 torr) between the brew chamber 110 and the coffee chamber 120. In another embodiment, described later with reference to FIG. 9, the pressure differential device 105 includes a pressure source coupled to the brew chamber 110 to force the brewed coffee from the brew chamber 110 into the coffee chamber 120. In either embodiment, the significant pressure differential provided by vacuum and/or by pressure can allow the operator to use finely ground coffee (e.g., having a diameter of from about 200μ to about 600μ and in a particular embodiment, about 200μ) that would otherwise clog typical existing commercially available batch brewers, such as high volume drip coffee brewers. Furthermore, in either embodiment, the gas port 115 can be selectively coupled to a pressure source 102 for purposes in addition to or in lieu of extracting the brewed coffee. For example, the pressure source 102 can agitate the coffee and water in the brew chamber 110 during the brewing process. Accordingly, the pressure source 102 can form a portion of the agitation device 170, described further below with reference to FIG. 5.

In a particular embodiment, the coffee chamber 120 can be positioned below the brew chamber 110, as shown in FIG. 1. In other embodiments, the brew chamber 110 and the coffee chamber 120 can have other positions relative to each other, particularly when, as discussed above, pressure or vacuum (rather than gravity) provides the primary force that directs the brewed coffee through the filter device 130 from the brew chamber 110 to the coffee chamber 120.

The coffee chamber 120 can have one or more side walls 121 (e.g. a conical side wall 121) and a base 122. In a particular embodiment, the system 100 is supported on the base 122 and in other embodiments, the system 100 can include other supports. For example, the system 100 can include an outer shell (e.g., a metal case or a plastic case) to provide support for the system 100. The outer shell can also serve a cosmetic purpose, e.g., by improving the outward appearance of the system 100. In at least some of these embodiments, the coffee chamber 120 includes the coffee outlet 123 and can further include a second valve 141b through which the brewed coffee is directed out of the system 100 after the brewing and extraction processes have been completed. In other embodiments, the coffee chamber 120 can serve as a carafe. Accordingly, the coffee chamber 120 need not include an outlet 123. Instead, the coffee chamber/carafe 120 can be removed from the system 100 (e.g., by separating it from the brew chamber 110) and the coffee can be poured out from the top of the coffee chamber/carafe 120.

In one embodiment, the processes for making coffee using the system 100 can be completed manually, e.g., via mechanical devices. In another embodiment, the system 100 can include a controller 140 for automatically controlling some or all of the processes used to make the coffee. The controller can include hard-wired circuits, and/or can be programmable. For example, the controller 140 can include a processor, memory and suitable input/output facilities. Accordingly, the controller 140 can receive sensor signals 142 (e.g. corresponding to system temperatures, pressures, flow rates and/or other suitable parameters) and can receive user inputs via a user input device 143 (e.g., buttons, a keyboard, touch screen, and/or other suitable device). Based on the received inputs, the system 100 can provide user outputs to a user output device 145 (e.g. a display panel) and it can provide system commands 144. The system commands 144 can automatically direct (e.g., activate, deactivate and/or modulate) the system components, e.g., the valves 141a, 141b, the boiler 160, the vacuum source 101 and/or the pressure source 102. The automated or partly automated processes available via the controller 140 can reduce the operator's workload and/or can improve the precision and/or consistency of the brewing and/or extraction processes.

Figure 2:
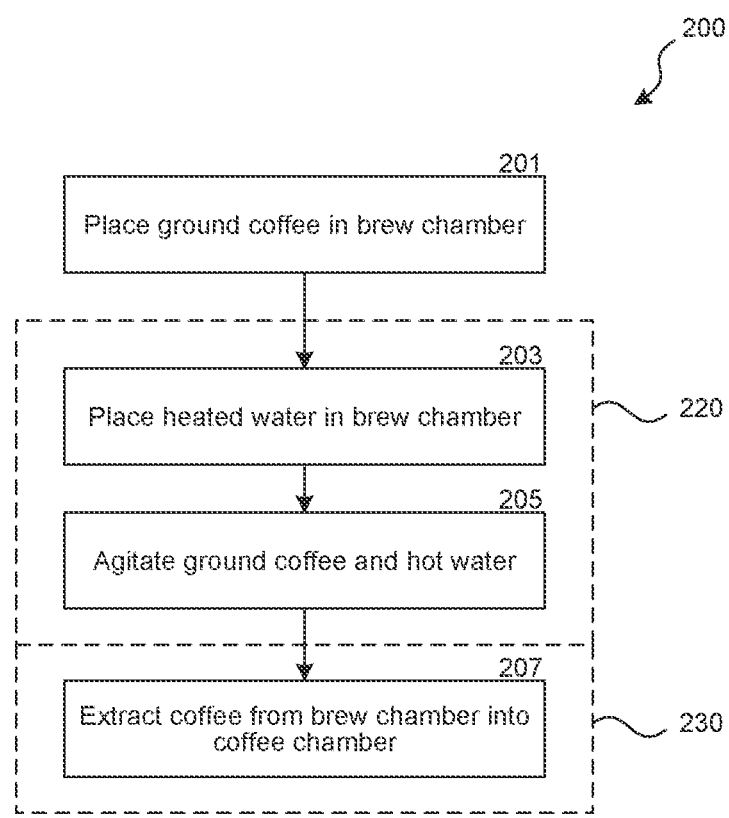
FIG. 2 is a flow diagram illustrating a process for brewing coffee in accordance with an embodiment of the present technology.

FIG. 2 is a flow diagram illustrating a process 200 for brewing coffee in accordance with a particular aspect of the disclosed technology. Individual steps in the process are then described further below with reference to FIGS. 3-7. The overall process 200 can include a first phase 220 that in turn includes brewing the coffee, and a second phase 230 that includes extracting brewed coffee from a brew chamber to a coffee chamber. In particular embodiments, each phase is undergone once, and in other embodiments, the first and second phases are repeated once, twice, or more times to produce a single batch of coffee.

Prior to the first phase, process portion 201 includes placing ground coffee in a brew chamber. In addition to standard grind sizes used by existing commercially available batch brewers, the coffee can be finely ground, for example, to a median diameter of from about 200μ to about 600μ, or about 320μ to about 400μ, about 335μ, or about 200μ. These diameters are significantly smaller than the 800μ diameter used in standard drip processes. The coffee can be spread thinly in the brew chamber, e.g. to a depth of less than 0.7 inches, or from about 0.2 inches to about 0.6 inches, or about 0.3 inches to about 0.5 inches, or about 0.4 inches, as measured after brewing. In general, spreading the coffee so as to have a post-brew depth of less than one inch can reduce the likelihood for the resulting coffee to have a bitter taste. On the other hand, spreading the coffee to have a post-brew depth of less than 0.1 inches can produce a brew chamber width or diameter that occupies too much space in a typical commercial setting.

During the first phase (process portion 203), a volume of heated water is placed in the brew chamber. The water can be heated using a boiler or other suitable device and can enter the chamber from any suitable port or opening. In any of these embodiments, the volume of heated water is placed in intimate thermal and physical contact with the coffee grinds in the brew chamber. Optionally, process portion 205 can include agitating the coffee grinds and the hot water, for example, using a mechanical device and/or an aeration process.

The second phase 230 can include process portion 207, in which a volume of brewed coffee is extracted from the brew chamber into the coffee chamber. In a particular embodiment, a vacuum is applied to the coffee chamber to draw the brewed coffee into the coffee chamber, and in another embodiment, pressure is applied to the brew chamber to drive the brewed coffee into the coffee chamber. In yet another embodiment, pressure is applied to the brew chamber, in combination with vacuum applied to the coffee chamber. In any of these embodiments, the extraction process can be completed after the water in the brew chamber has completed the brew cycle (e.g., to extract flavor from the ground coffee), and can be completed in a short period of time (e.g., to prevent the brewed coffee from being in contact with the coffee grinds for too long, which can cause the coffee to taste bitter). Accordingly, the pressure differential between the brew chamber and the coffee chamber can be less than 60 torr (e.g., zero) during the first phase 220, and greater than 60 torr during the second phase 230. For example, the brew chamber can be at atmospheric pressure during the first phase 220. During the first phase 220, a small amount of brewed coffee can pass from the brew chamber to the coffee chamber under the force of gravity, but the pressure differential between the chambers will be less than 60 torr. The fineness of the grind used in the process (which can enhance the coffee flavor strength) can also reduce the amount of brewed coffee that may leak from the brew chamber 110 to the coffee chamber 120 during the brew cycle. This in turn improves the controllability and reproducibility of the brew process because all or virtually all of the coffee will spend approximately the same amount of time in the brew chamber.

In at least some embodiments, the process ends at process portion 207. Accordingly, the grounds placed in the brew chamber in process portion 201 are used once with a single volume of water to produce a corresponding single volume of coffee. In other embodiments, the same grinds can be used for multiple volumes of coffee. Accordingly, process portion 203, 205 (optionally) and 207 can be repeated in series, once, twice, three times or more to produce a combined volume of coffee in the coffee chamber, with the combined volume being formed from individual volumes of coffee, each of which has been brewed with the same set of grinds.

In addition to quickly extracting the brewed coffee from the brew chamber into the coffee chamber, the high pressure differential provided by the pressure differential device can dry the grinds in the brew chamber. As a result, the dry grinds can provide a better starting point for the second (and any further subsequent) brew processes. Therefore, the likelihood for the subsequent processes to produce a bitter-tasting coffee can be further reduced. In addition, the strong pressure differential can remove the majority of dissolved gasses from the coffee grinds, which may be trapped in the coffee beans used to produce the grind during the roasting process. As a result, in subsequent extractions following the first extraction, the grinds can have a significantly larger exposed surface area, and the water used during the subsequent extractions can contact the additional surface area, which is no longer blocked by gas.

Figure 3:
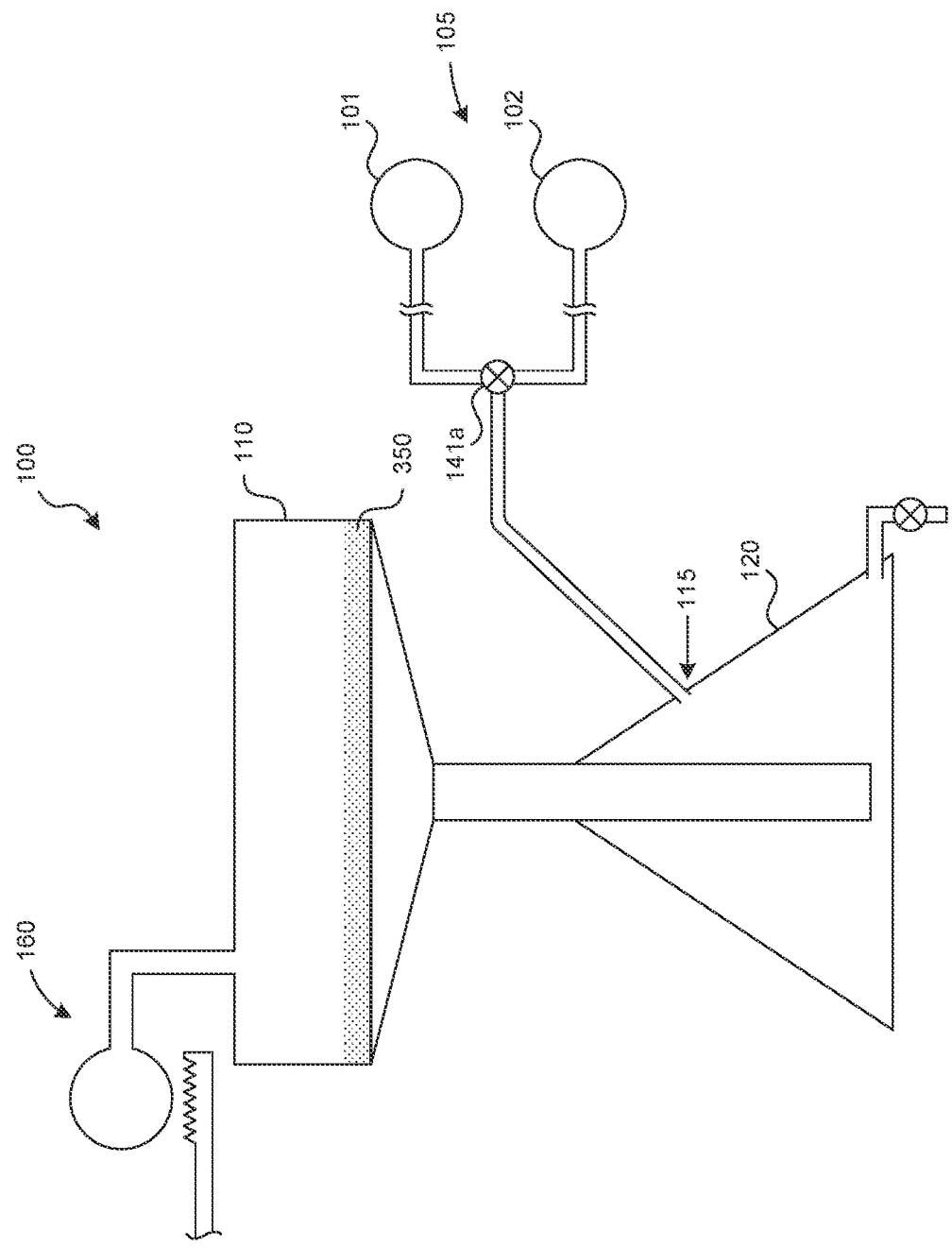
FIG. 3 illustrates the system of claim 1, with ground coffee placed in a brew chamber, in accordance with an embodiment of the present technology.

FIGS. 3-7 illustrate several phases of the foregoing process. FIG. 3 illustrates the system 100 after an amount of coffee grinds 350 has been added to the brew chamber 110. As discussed above, the coffee grinds 350 can be spread in a relatively thin layer over the large surface area provided by the filter device 130.

Figure 4:
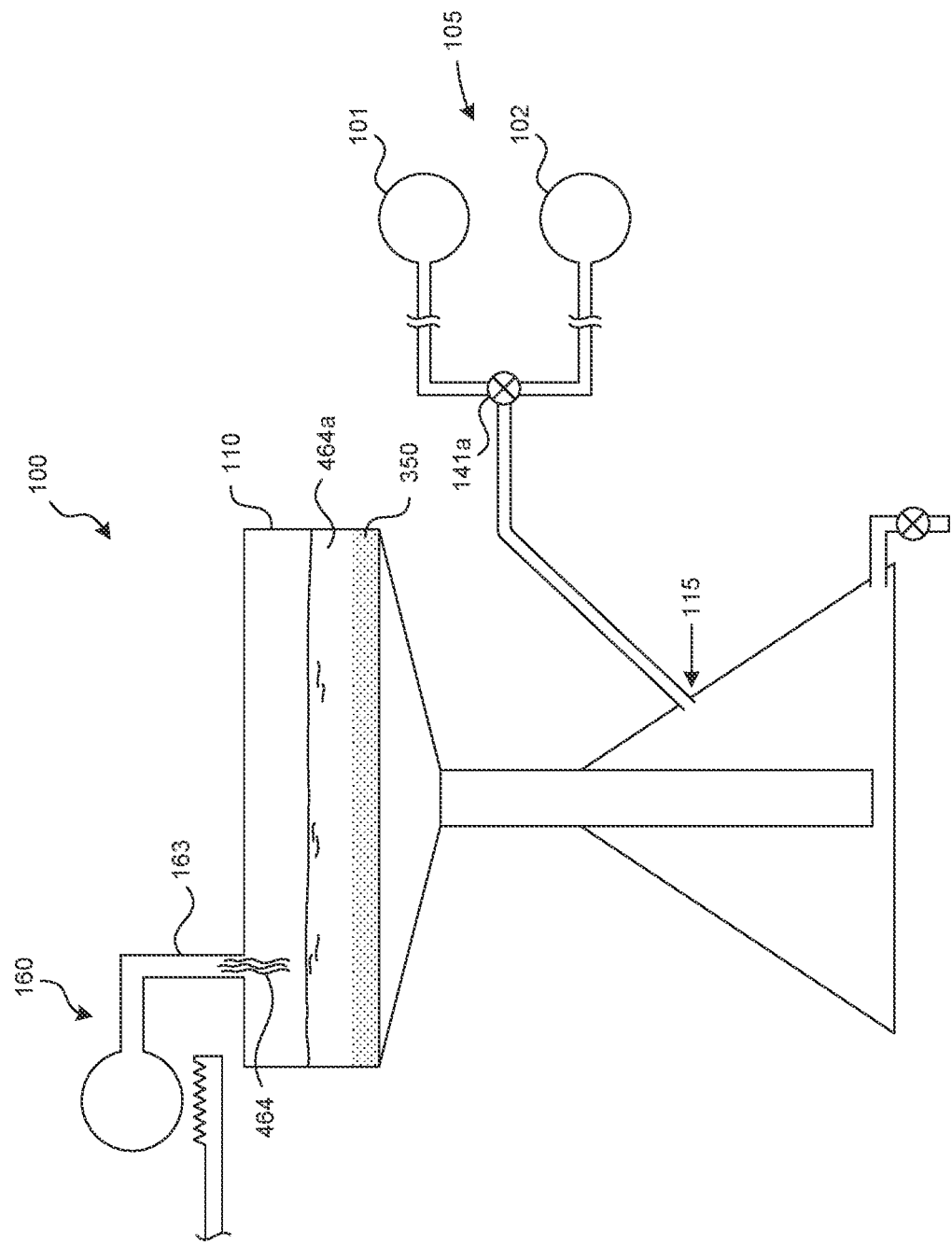
FIG. 4 illustrates the system of claim 3, with water added to the brew chamber in accordance with an embodiment of the present technology.

In FIG. 4, hot water 464 is introduced into the brew chamber 110 so as to be in intimate physical and thermal contact with the coffee grinds 350. The hot water is introduced from the boiler 160, and is directed into the brew chamber 110 until a first volume 464a of hot water is positioned in the brew chamber 110. The first volume 464a remains in the brew chamber and in contact with the ground coffee 350 until the brewing process with the first volume 464a has been completed.

Figure 5:
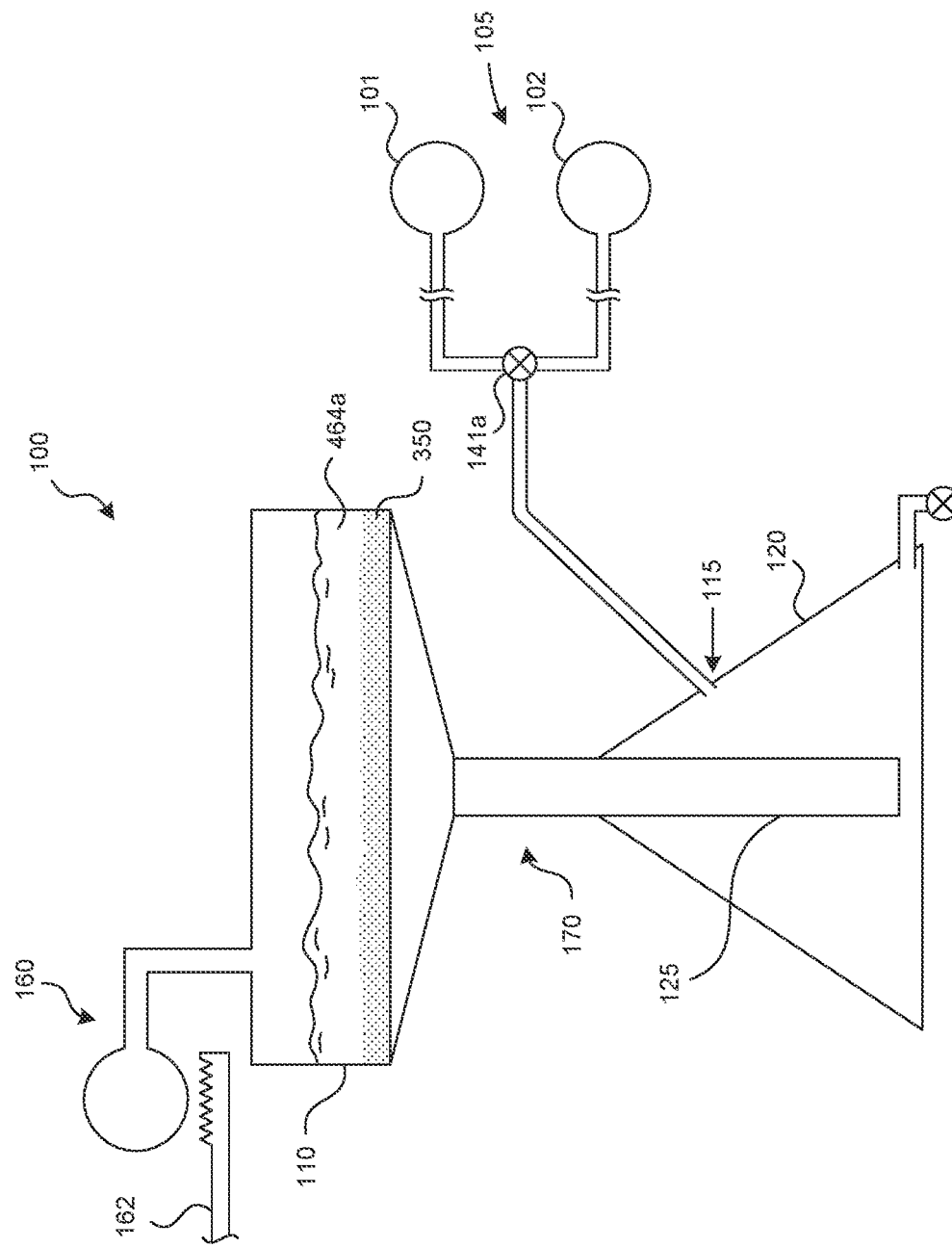
FIG. 5 illustrates the system of claim 4, with the water and ground coffee agitated in accordance with and embodiment of the present technology.

As shown in FIG. 5, an optional part of the brewing process can include agitating the coffee grinds 350 and the first volume 464a of hot water, e.g., via the agitator 170. In a particular aspect of this embodiment, the pressure source 102 is activated and the first valve 141a is configured to allow pressurized air (or another gas) from the pressure source 102 into the brew chamber 110. Accordingly, the agitator 170 can include an aerator. The pressurized air agitates both the coffee grinds 350 and the first volume 464a of hot water. The pressure provided by the pressure source 102 is controlled or modulated to provide adequate agitation without unnecessarily splashing or scattering or over-agitating the coffee grinds 350, the brewed coffee, and/or the first volume of water 464a. Over-agitation can lead to over-extraction during any given extraction process, which can produce bitter-tasting coffee. If the system 100 includes the flow tube 125, the pressure source 102 can direct coffee that may already be present in the coffee chamber 120 back into the brew chamber 110, e.g., to supplement the agitation action provided by the air or other gas, and/or to re-introduce already-brewed coffee into the brew chamber. The process of re-introducing already-brewed coffee can be used to modify the level of extracted solids present in the solvent during extraction, offering an additional level of control over the extraction process. The flow tube 125 can also reduce the likelihood for coffee to be aspirated into the vacuum source 101 during the coffee extraction process, which is described in further detail below.

Figure 6:
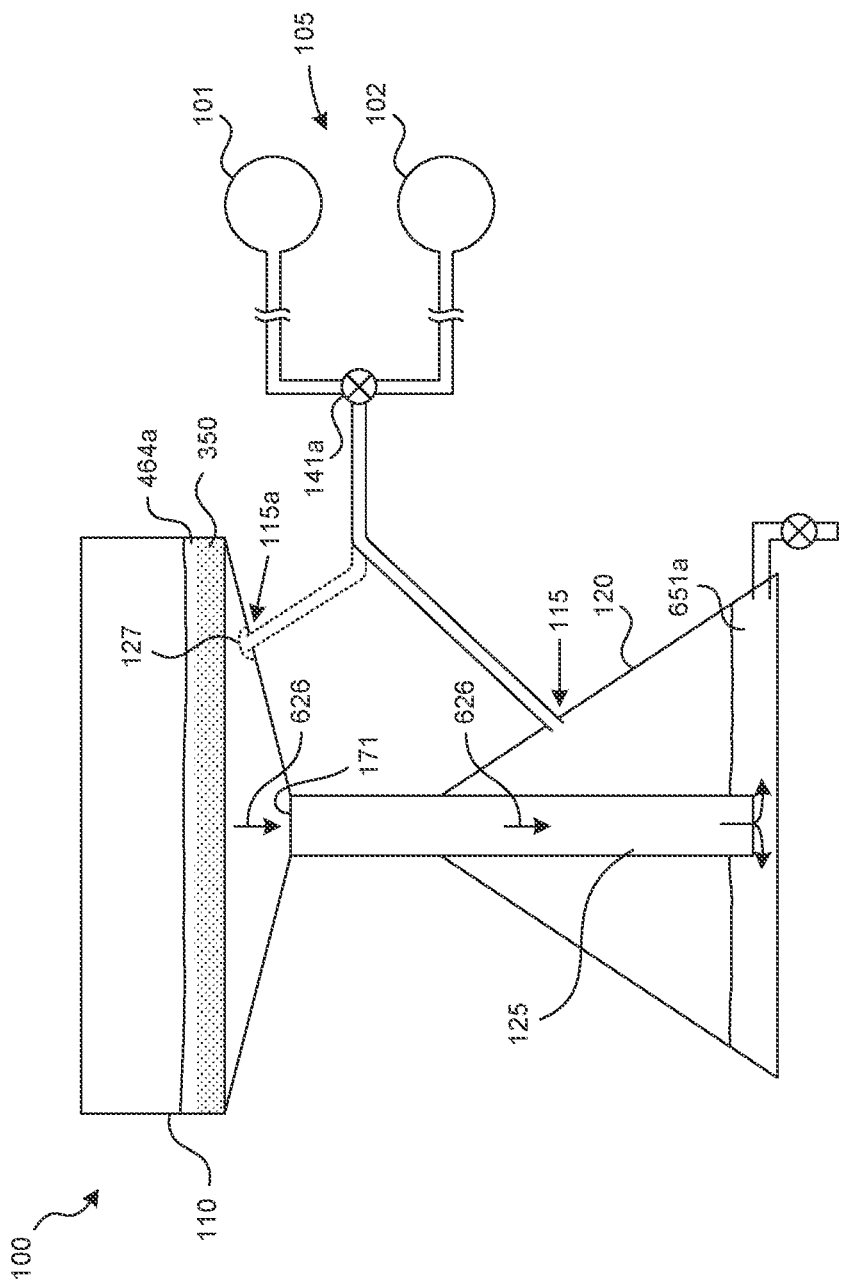
FIG. 6 illustrates the system of claim 5, with coffee being extracted from the brew chamber to a coffee chamber in accordance with an embodiment of the present technology.

Once the brewing process (e.g., the initial brewing process) has been completed (which can take from about 5 seconds to about 5 minutes), the brewed coffee is removed from the brew chamber 110 and directed into the coffee chamber 120. For example, as shown in FIG. 6, the brewed coffee follows a flow path 626 from the brew chamber 110 to the coffee chamber 120 and collects in the coffee chamber 120, forming a first volume 651a of extracted coffee. In order to force the extracted coffee at a high volumetric flow rate from the brew chamber 110 to the coffee chamber 120, the vacuum source 101 is activated and the first valve 141a is adjusted to connect the vacuum source 101 with the coffee chamber 120. The vacuum source 101 can create a negative pressure in the coffee chamber 120, e.g., an absolute pressure of from about 0.000000001 (or $10^{-9}$) torr to about 700 torr, or about 150 torr to about 660 torr, or about 175 torr to about 400 torr, or about 175 torr. When the brew chamber 110 is at atmospheric pressure, the foregoing absolute pressures correspond to pressure differentials (between the brew chamber 110 and the coffee chamber 120) of from about 60 torr to about 759.999999999 torr, or about 100 torr to about 610 torr, or about 360 torr to about 585 torr, or about 585 torr. Accordingly, the pressure differential is at least 60 torr. In other embodiments, the pressure differential can have other threshold values. For example, in certain embodiments, the pressure differential for a single-extraction device is at least 150 torr or about 360 torr to about 585 torr, or about 585 torr. The pressure differential device 105 can have a flow capacity suitable for any of the pressure differentials described above, for example, a flow rate of at least one cubic foot per minute (CFM), e.g., for a period of at least 5 seconds.

The pressure differential draws the extracted coffee from the brew chamber 110 to the coffee chamber 120. Because the gas port 115 is located above the first volume 651a of extracted coffee, the extracted coffee that collects in the coffee chamber 120 is not sucked through the gas port 115 by the vacuum source 101. Representative extraction times of each extraction process can range from about 5 seconds to about 60 seconds, depending on factors that include the pressure differential level, the volume of coffee removed from the brew chamber 110 with each extraction, and the fineness of the coffee grind.

In another embodiment, also illustrated in FIG. 6, the gas port can have other locations. For example, a gas port 115a can be located beneath the filter device 130, but above the coffee chamber 120, provided the gas port 115 includes an arrangement for preventing the extracted coffee from being aspirated into the vacuum source 101. Accordingly, the system 100 can include a shield 127 that prevents aspiration, while allowing the extracted coffee to proceed into the coffee chamber 120 under the force of gravity, after it has been extracted through the filter device 130.

Figure 7:
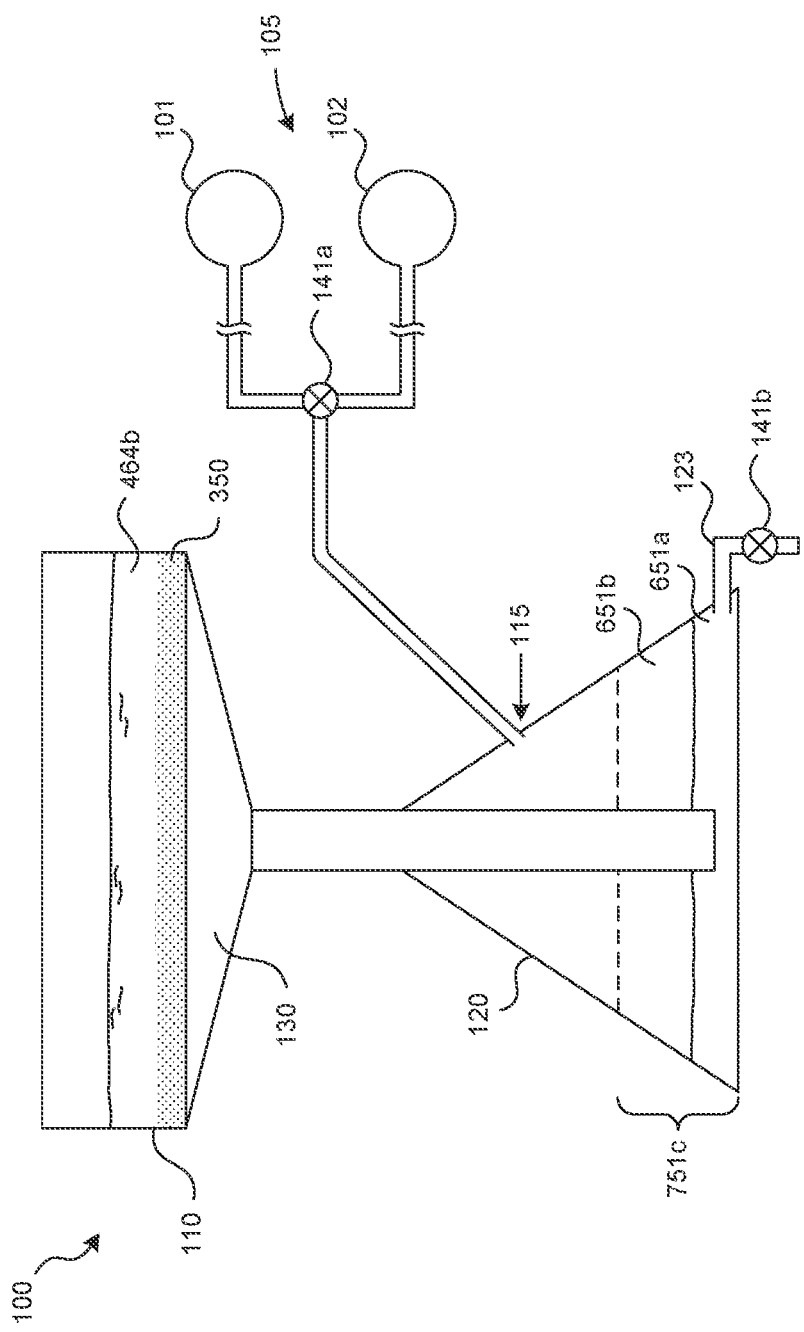
FIG. 7 is a partially schematic illustration of the system shown in FIG. 6 with a second volume of water positioned to undergo a second brewing process and a second extraction process in accordance with an embodiment of the present technology.

As shown in FIG. 7, a second volume of hot water 464b has been placed in the brew chamber 110 and the process described above with reference to FIGS. 5 and 6 is repeated. The result is that a second extracted coffee volume 651b is directed through the filter device 130 and into the coffee chamber 120 to mix with the first extracted coffee volume 651a. The combined extracted coffee volume 751c is then withdrawn from the system via the coffee outlet 123 and the second valve 141b.

Figure 8:
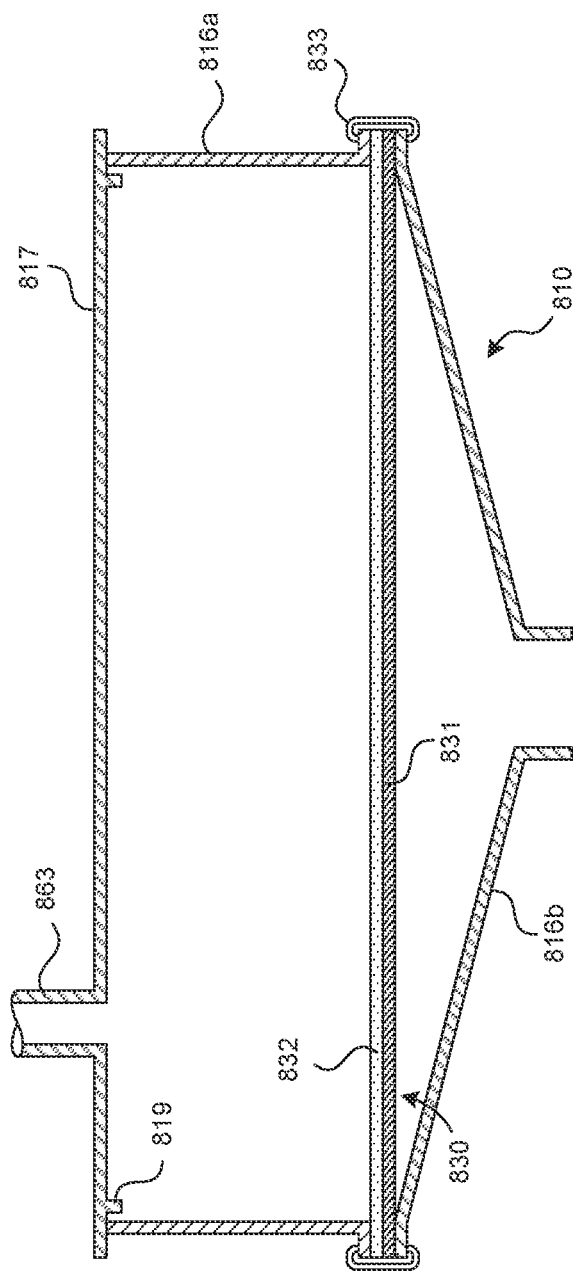
FIG. 8 is a partially schematic, cross-sectional illustration of a brew chamber having a filter device configured in accordance with an embodiment of the present technology.

With reference now to FIG. 8, a representative brew chamber 810 can include a filter device 830 having multiple components. In a particular embodiment of the present technology, for example, the filter device can include a re-usable, perforated filter support 831 that carries a disposable filter element 832. In a further aspect of this embodiment, the filter device 830 can be fixedly but releasably positioned in the brew chamber 810, and can include a non-disposable filter. For example, the brew chamber 810 can include an upper portion 816a that is removeably coupled to a corresponding lower portion 816b. The filter device 830 can be positioned between the upper and lower portions, and can be held in place with a filter clamp 833 that also releasably couples the upper and lower portions 816a, 816b together. The filter support 831, the filter element 832, and the filter clamp 833 are configured to withstand a positive or negative pressure applied to the system during the coffee extraction process. The filter element 832 can be formed from any of a number of suitable media, including paper, cloth and/or perforated metal. In a representative embodiment, the filter element 832 is formed from paper, with a pore size of about 5 microns.

The brew chamber 810 can further include a lid 817 having one or more retention elements 819 that keep it centered on the upper portion 816a. A corresponding water inlet conduit 863 can be built into the lid 817. In one embodiment, the lid 817 can be held in place with a clamp (similar to the clamp described below with reference to FIG. 9). In other embodiments, the force of the vacuum applied to the brew chamber 810 keeps the lid in place during the extraction process.

Figure 9:
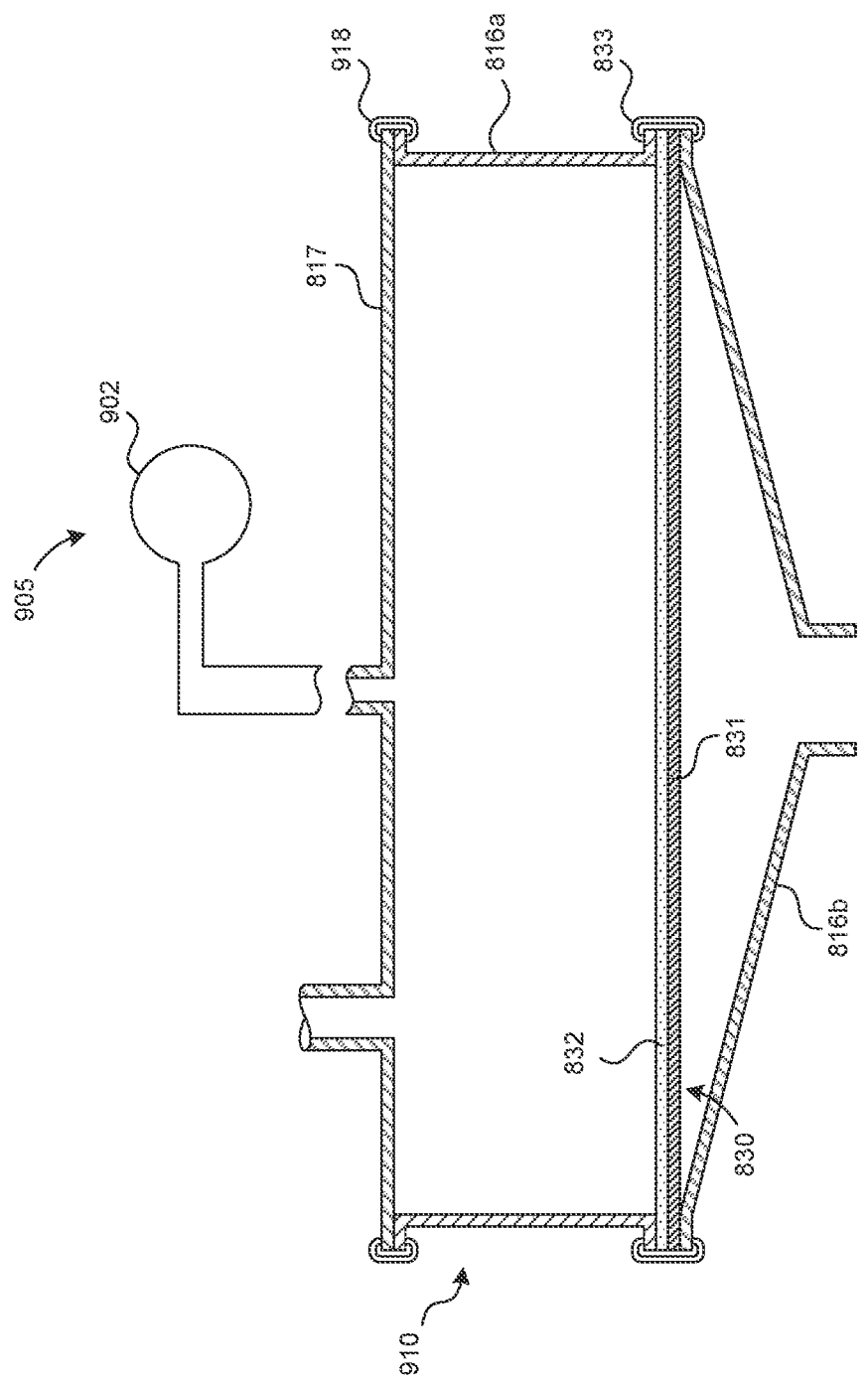
FIG. 9 is a partially schematic, cross-sectional illustration of a brew chamber configured to be pressurized in accordance with an embodiment of the present technology.

FIG. 9 illustrates a brew chamber 910 configured in accordance with still another embodiment of the present technology. In one aspect of this embodiment, the upper portion 816a of the brew chamber 910 is pressurized, in contrast with the arrangement described above in which the lower portion 816b of the brew chamber 910 is subjected to a vacuum. Because the upper portion 816a is pressurized, the upper portion 816a is coupled to a pressure differential device 905 that includes a pressure source 902. A chamber lid 817 is releasably connected to the upper portion 816a with a removable lid clamp 918. In particular embodiments, the system includes a pressure release mechanism that releases the pressure in the brew chamber 910 during the brewing process. Accordingly, the elevated pressure in the brew chamber 910 can be provided only during the process of directing post-brew coffee from the brew chamber 910 into an associated coffee chamber. The brew chamber 910 is accordingly sealed during the foregoing extraction process to prevent a pressure leak from the brew chamber 910 that would reduce the efficiency with which the applied pressure extracts the brewed coffee from the brew chamber 910. In a representative process, the upper portion 816*a* is pressurized to a value up to about two atmospheres (e.g., about 30 psi absolute pressure or 15 psi gage pressure) and in other embodiments, the upper portion 816*a* is pressurized to a value up to about ten atmospheres. In any of these embodiments, the pressure source 902 can provide enough pressure to produce a pressure differential of at least 60 torr between the upper portion 816*a* and the lower portion 816*b* (or the associated coffee chamber).

Table 1 below illustrates representative results obtained using an apparatus generally similar to that described above with reference to FIGS. 1 and 8. In this embodiment, a total of three extraction processes were performed to produce approximately one liter of brewed coffee. The process was conducted at two different vacuum levels: a first or high vacuum of 176 torr (absolute pressure), and a second or medium vacuum of 659 torr (absolute pressure). At each vacuum level, coffee was produced using three different grind sizes. Grind A corresponds to a fine grind (finer than the standard drip grind of 800*p*), grind B corresponds to an espresso grind (which is finer than grind A) medium grind, and grind C corresponds to an espresso fine grind, e.g., a grind finer than typical espresso grind. The foregoing extraction processes were conducted with a system having a 5-inch diameter brew chamber.

TABLE 1

|  | Grind "A" | Grind "B" | Grind "C" |
|---|---|---|---|
| High Vacuum | First Pull: 15 sec | First Pull: 10 sec | First Pull: 30 sec |
| (Vac Attained: | Second Pull: 30 sec | Second Pull: 32 sec | Second Pull: 40 sec |
| 176 torr) | Third Pull: 20 sec | Third Pull: 42 sec | Third Pull: 60 sec |
| Med Vacuum | First Pull: 20 sec | First Pull: 30 sec | First Pull: 35 sec |
| (Vac Attained: | Second Pull: 30 sec | Second Pull: 45 sec | Second Pull: 55 sec |
| 659 torr) | Third Pull: 30 sec | Third Pull: 40 sec | Third Pull: 60 sec |

Each complete brew was performed using 43 grams of coffee and one liter of water, with a cloth filter. Each first pull or extraction used 400 mL of water, and each second and third pull or extraction was performed with 300 mL of water. The average height of the coffee grinds resting on the filter, after the brew process was complete, was approximately 0.4 inches. An additional set of results was obtained using a paper rather than a cloth filter for grind C. The results included a faster extraction process, with the second and third pulls at 20 seconds each, rather than at 40 and 60 seconds, respectively, for the high vacuum. When the medium vacuum was used, the extraction process was longer, including 40 seconds for the first pull, 70 seconds for the second, and 65 seconds for the third. The times in Table 1 are extraction times only. Corresponding brewing times were 40 seconds per cycle, prior to initiating extraction.

Table 2 below illustrates representative results obtained using another apparatus generally similar to that described above with reference to FIGS. 1 and 8. In this embodiment, a paper filter was used in place of a cloth filter. In addition, the system included a 7-inch brew chamber, and the pull times were reduced compared to the times shown in Table 1.

TABLE 2

|  | Grind "A" | Grind "B" | Grind "C" |
|---|---|---|---|
| High Vacuum | First Pull: 8 sec | First Pull: 8 sec | First Pull: 9 sec |
| (Vac Attained: | Second Pull: 12 sec | Second Pull: 8 sec | Second Pull: 7 sec |
| 176 torr) | Third Pull: 8 sec | Third Pull: 15 sec | Third Pull: 18 sec |
| Med Vacuum | First Pull: 5 sec | First Pull: 8 sec | First Pull: 12 sec |
| (Vac Attained: | Second Pull: 8 sec | Second Pull: 8 sec | Second Pull: 15 sec |
| 659 torr) | Third Pull: 10 sec | Third Pull: 15 sec | Third Pull: 20 sec |

Further, the average height of the coffee grinds resting on the filter, after the brew process was complete, was approximately 0.2 inches. The times in Table 2 (like those in Table 1) are extraction times only. Corresponding brewing times were 40 seconds per cycle, prior to initiating extraction.

Each of the foregoing tests produced a flavorful cup of coffee, notably lacking in bitterness. For purposes of comparison, Grind A (the coarsest grind) was also tested in a drip coffee brewer. The process took 7 minutes for 43 grams of grinds and one liter of water, and the coffee produced was markedly bitter. The height of the coffee grinds under these conditions, in a cone filter, was approximately two inches.

In at least some embodiments, it is expected that the foregoing times listed in Tables 1 and 2 can vary by ±5 seconds. Accordingly, a pull of 30 seconds can correspond to a range of from about 25 to about 35 seconds. As used herein, the term "about" when used in the context of pull times means within 2 seconds. In general, the term "about" means within 10%, as applied to temperatures, pressures, flow rates, and dimensions.

Figure 10:
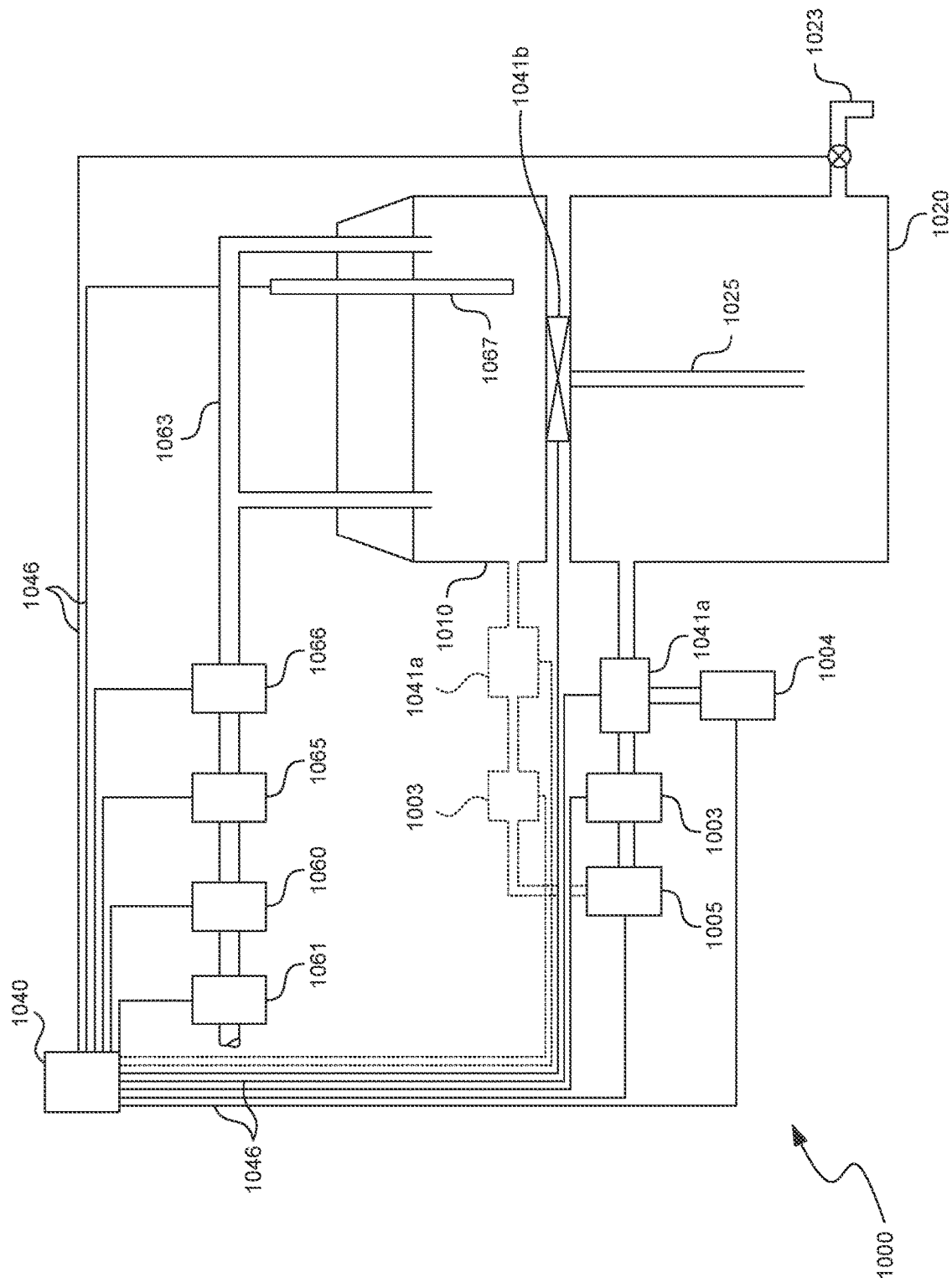
FIG. 10 is a schematic illustration of an automated coffee making system configured in accordance with another embodiment of the present technology.

FIG. 10 is a schematic illustration of a system 1000 that is automated in accordance with an embodiment of the present technology. Accordingly, the system 1000 can include a controller 1040 (e.g., a microcontroller) that communicates with several of the system components via signal lines 1046. The signal lines 1046 can be used to transmit sensed information to the microcontroller 1040 and/or provide instructions from the controller 1040 to the components of the system 1000.

The system 1000 can include a brew chamber 1010 coupled to a coffee chamber 1020 via a chamber valve 1041*b*. Coffee grinds are placed in the brew chamber 1010. Brewed coffee is extracted through a filter (not visible in FIG. 10), through the chamber valve 1041*b*, through a flow tube 1025, and into the coffee chamber 1020. The resulting coffee can be removed from the coffee chamber 1020 via a coffee outlet 1023.

The brew chamber 1010 receives water from a water source 1061, which is heated in a boiler 1060, and can be pressurized for flow into the brew chamber 1010 with a water pump 1065. A flow meter 1066 can be used to measure and/or modulate the flow of water through a corresponding water inlet conduit 1063 into the brew chamber 1010. The system can include one or more temperature sensors, for example, a temperature sensor 1067 positioned to measure the temperature of the water at the brew chamber 1010.

A pressure differential device 1005 provides vacuum and/or pressure to direct extracted coffee from the brew chamber 1010 into the coffee chamber 1020. The pressure differential device 1005 can create the required pressure differential via positive and/or negative pressure. One or more optional regulators 1003 and/or pressure differential valves 1041a control the introduction of vacuum or pressure provided by the pressure differential device 1005, and control the communication between the pressure differential device 1005 and the coffee chamber 1020 and/or the brew chamber 1010. In other embodiments, the regulator(s) 1003 can be eliminated, and instead, the pressure differential device 1005 can have fixed, known vacuum/pressure parameters for controlling the pressure differential between the brew chamber 1010 and the coffee chamber 1020. In any of these embodiments, the pressure differential device 1005 can include one or more components that apply a vacuum to the coffee chamber 1020 (as shown in solid lines), and/or one or more components that apply pressure to the brew chamber 1010 (as shown in dashed lines). A secondary pump 1004 can be coupled to the coffee chamber 1020, for example, to provide the agitation force described above with reference to FIG. 5. In particular embodiments, an additional regulator can be coupled to the secondary pump 1004 to control the timing and/or pressure provided during the agitation process.

A representative process for using the system 1000 described above with reference to FIG. 10 is described below.

Step 1: Program the controller 1040 to set brew parameters (e.g. temperature, water volume per brew/extraction cycle, vacuum/pressure strength and/or start and end times, agitation start and/or end times, and/or agitation strength). An operable combination of parameters is referred to as a "program".

Step 2: Securely fasten a clean filter into the brew chamber 1010. Depending on the embodiment, this may include placing the filter in the brew chamber 1010, and securely clamping the filter in place to prevent grinds from passing through or around the corners of the filter during brewing, and to prevent the filter from overly warping if the coffee is agitated during the brew cycle. In representative embodiments, the force provided by the process of clamping the filter in place is higher than is used in conventional processes so as to withstand the higher pressure differential supplied by the pressure differential device 1005.

Step 3: Place a selected weight of ground coffee into the brew chamber 1010, resting the grind on top of the filter.

Step 4: Initiate the program at the controller 1040. If the controller 1040 includes a touchscreen display, initiating can include pressing a "Start" button. In other embodiments, the start button can include a physical button and/or another suitable interface.

Step 5: The controller 1040 directs water from the water source 1061 to the boiler 1060, where the water is heated to a selected temperature specified in the program (or if water is not provided through a water line, water may be manually placed into boiler, with heating commencing once the water has been placed in the boiler).

Step 6: The water reaches the temperature programmed into the controller 1040. In representative embodiments, the temperature of the water is from about 195° F. to about 205° F. The temperature of the water can be controlled via a feedback device (e.g., a PID controller). In another embodiment, the water is allowed to come to a boil and then rest for pre-specified time to arrive at the programmed temperature. For example, the controller 140 can allow the water to come to a boil, rest for a pre-specified time, and then introduce the water without any specific feedback regarding the temperature of the water. For example, the water can be boiled and then rest for 30 seconds or the water can be heated instantaneously or nearly instantaneously to a programmed temperature, for example, using an induction heater. In at least some of these embodiments, the controller 1040 can direct the boiler 1060 to release a specified volume of heated water, e.g., via a valve. The amount of water can be set by the program. The released water passes into the brew chamber 1010 so as to be in contact with the coffee grinds. The total volume of water released into the brew chamber 1010 may be regulated by the flow meter 1066 placed between the boiler 1060 and the brew chamber 1010, or the valve can be time-actuated. Without a flow meter present, opening the water valve for a period of time specified in the program means that different water line pressures will lead to different volumes of water being dispensed. Accordingly, the flow meter 1066 can produce a relatively consistent dispensed water volume, despite different water line pressures present in different environments.

Step 7: The coffee brewing in the brew chamber 1010 is (optionally) exposed to agitation, via an air pump that introduces bubbles, and/or via another agitation mechanism, such as a mechanical stirrer, for an amount of time and at an intensity provided for in the program.

Step 8: The brew chamber 1010 is exposed to, acted upon, or subjected to a vacuum and/or an elevated pressure for an amount of time and at a level provided for in the program, evacuating the brew chamber of fluid. In a particular embodiment, nearly all the brewed coffee is evacuated (using a pressure source, vacuum source or both) from the brew chamber, leaving the nearly dry grinds resting on the filter. For example, the grinds can be dried to the point at which only 5-10% of the water initially added to the grinds remains in the grinds after the extraction process. In a representative process, the system shown in FIG. 10 can be used to obtain 950 mL of coffee from an initial volume of one liter of water. By contrast, one liter of water used in a drip process typically yields only 880-890 mL of brewed coffee. As discussed above, more completely drying the grinds can reduce the likelihood for any remaining water to continue extracting coffee from the coffee grinds. As a result, the process of extracting coffee can be more carefully and precisely controlled, which in turn prevents the process from inadvertently over-extracting coffee from the grinds, which can lead to bitter-tasting coffee. Instead, the drying process can more effectively stop the coffee extraction process, and allow the extraction process to restart at a controlled, selected time, for example, when a subsequent brewing process begins. In addition, increasing the amount of coffee extracted from the coffee grinds can produce more coffee per extraction process, and/or can reduce the amount of coffee grinds needed for a given extraction process or series of processes. In another embodiment, the brewed coffee is not completely evacuated, and is instead only partially evacuated, before the introduction of fresh water into the brew chamber.

Step 9: In particular embodiments, e.g., those embodiments that include multiple extractions from a single mass of coffee grinds, Steps 6-8 are repeated at least once, optionally with different parameters for time, vacuum force, water volume and/or other parameters, specified in the program for each repetition. Step 7 may or may not be used during any of the foregoing extraction processes, depending on factors that can include the type of coffee being brewed and/or the desired coffee flavor.

Step 10: Once the extraction process has been repeated a suitable number of times, as specified in the program, the brewed coffee that has been evacuated into the coffee chamber is ready for consumption. The coffee may be removed from the coffee chamber via any of a variety of suitable mechanisms, depending on the design of the coffee chamber. For example, coffee can be removed via a spout, or the coffee chamber can be a removable thermal carafe, allowing the user to remove the coffee chamber completely once brewing is complete. The carafe can be used to pour the brewed coffee into a cup.

Step 11: Once the entire brewing process is complete, the filter can be removed from the brew chamber, along with the used grounds. Depending on the filter design, the filter may either be cleaned for later use, or disposed of.

Step 12: With the filter removed, the brewing device can be cleaned. Cleaning can include manual cleaning using traditional cleaning methods, such as sponge and soap, or can include repeating Steps 4-10 above, without the introduction of coffee grounds. The introduction of heated, agitated water into the system without coffee grounds will have the effect of dissolving residual brewed coffee and eliminating grinds that were not eliminated upon the removal of the filter.

One feature of at least some of the foregoing embodiments described above is that a single quantity of brewed coffee can be made by extracting multiple volumes of heated water through the same set of coffee grinds. An advantage of this approach, when compared to conventional approaches, is that the amount of coffee grinds required to produce a cup of flavorful coffee can be reduced significantly. For example, it is expected that the foregoing technique can reduce the required amount of coffee beans by approximately 30% or more, by weight, when compared to conventional drip and/or other coffee making processes. Furthermore, the multiple extraction process allows smaller, more carefully controlled quantities of water to go through the brewing process, which further improves the uniformity of contact between any quantity of water and the coffee grinds. Performing multiple short duration extractions is also less likely to produce bitter coffee than one long-duration extraction, and adding multiple volumes of fresh solvent to the coffee is more likely to extract additional flavor compounds that would otherwise remain unextracted. This result can be based upon a number of factors. For example, bitters (e.g., primarily tannins) are typically extracted from the coffee grinds later in the extraction process. Accordingly, by adding fresh solvent (e.g., water), the brew or extraction process is restarted with each new controlled quantity of solvent added to the grinds. Accordingly, as more of the total brewing/extraction time is spent early in the brewing process for each of the multiple extractions, bitters are less likely to be extracted. By adding a new volume of water for each of the multiple extractions, a new phase partition equilibrium (solid/liquid) begins. In particular, there are no dissolved materials in the newly-added water at the beginning of each new extraction cycle. For each new cycle, the phase partitioning process begins again, with the same compounds partitioning into the new volume of water at set times. Because the bitters are released from the coffee grounds at a generally fixed point in time after the brewing process starts, the brewing process can be deliberately stopped before that point is reached. Furthermore, multiple extraction processes, each using the same set of grinds and a new volume of water, can produce more organic flavor compounds in the resulting coffee.

Another feature of at least some of the foregoing embodiments is that a relatively large pressure gradient can be formed between the brewing chamber and the coffee chamber. As discussed above, the pressure gradient can be formed by pressurizing the brewing chamber and/or applying a vacuum to the coffee chamber. A result of the large pressure gradient is that the brewed coffee is quickly extracted from the brewing chamber, therefore allowing more precise control over the amount of time that the brewed coffee is in direct contact with the coffee grinds. This in turn allows the operator to produce flavorful coffee without the coffee becoming bitter as a result of spending excessive time in contact with the coffee grinds. For example, the large pressure gradient can pull a thin layer of water quickly through the filter so that all or a significant portion of the coffee grinds are in contact with water for approximately the same amount of time. By contrast, conventional gravity extraction processes typically are not as amenable to the level of control outlined by the processes described above. It is difficult to brew coffee in conventional manners to produce larger quantities of coffee without a bitter taste. The large pressure gradient can be particularly useful for finer grinds, for which existing methods either are incapable of brewing fast enough to prevent high bitterness levels, or are incapable of producing a brew at all, for example, due to the filter clogging when used with very fine grinds.

Still another feature of at least some of the foregoing embodiments is that the brewing chamber and in particular, the filter, can have a large surface area when compared with the volume of coffee grinds that are placed on the filter and/or the volume of coffee produced. The result is that the coffee grinds can form a relatively thin layer of coffee over the filter. This in turn results in a more uniform brew. For example, each portion of hot water passing through the bed of coffee grinds passes through coffee grinds that have been exposed to approximately the same quantity of water. The coffee produced in this manner has a concentration and taste similar to that of drip coffee, without the bitterness associated with other conventional coffee brewing techniques, and is produced in a shorter period of time than typical drip techniques. This is unlike conventional arrangements in which the bed of coffee grinds is relatively deep. In such an arrangement, some water passes through only a portion of the total depth when extraction begins, and other water passes through the entire depth, a problem that is often associated with making espresso, and which is referred to as channeling. Also, for example, utilizing a relatively thin layer of coffee over the filter can improve the controllability and reproducibility of the brew process because all or virtually all of the coffee will spend approximately the same amount of time in the brew chamber. In addition, a thin layer of coffee grinds can significantly accelerate the extraction process by reducing the barrier through which coffee must travel to enter the coffee chamber upon extraction.

Still another advantage of the foregoing feature is that the large filter surface area can reduce or eliminate the likelihood for clogging during the extraction process. In particular, the relatively large filter surface area (e.g., in combination with the large pressure differential created by the pressure differential device) can allow the system to brew from finer grinds (e.g., less than approximately 400 microns) without clogging, e.g., because for a fixed weight of grinds, a larger filter surface area will result in a shallower grind bed, and hence create less fluidic resistance to water flowing through the grinds. Finer grinds can typically produce more flavor per unit of extraction time, because they have greater surface area for a given weight of grind and hence organic compounds from the grinds can be extracted more quickly into solvent (e.g. water), but can also produce bitters more quickly. Accordingly, controlling the timing of individual brew cycles can allow the system to consistently and reproducibly produce flavorful, non-bitter coffee.

Still another feature of at least some of the foregoing embodiments is that the system can include an active device that applies a vacuum or a positive pressure to the brewing chamber to direct brewed coffee into the coffee chamber. Unlike conventional siphon devices, which typically rely on a small vacuum produced by condensing and/or cooling air and/or water vapor in the coffee chamber, the foregoing arrangement produces significantly higher vacuums and/or pressures, which can expedite the process for withdrawing coffee from the brew chamber, reducing or eliminating the bitterness that can result from the brewed coffee spending too much time in contact with the coffee grounds.

From the foregoing, it will be appreciated that specific embodiments of the technology have been described herein for purposes of illustration, but that various modifications may be made without deviating from the technology. For example, the pressurized brew chamber described above with reference to FIG. 9 can be applied to any of the foregoing embodiments. A representative one-liter coffee maker can have a filter diameter of about 5 inches, and a representative two-liter coffee make can have a filter diameter of about 7 inches. In other embodiments, the filter diameters can have other suitable values, e.g., depending on the coffee volume, that produce relatively shallow grind beds suitable for multiple, quick extractions. For example, the filter can have a diameter of 12 inches for a 4-6-liter capacity, or a diameter of 1.5-2 inches for a single cup. Other suitable filter diameters range from 3 inches to 17 inches. The capacity of the brew chamber and/or the coffee chamber can range from about 1 liter or less (e.g., about 200 mL, which is significantly larger than typical espresso makers) to about 12 liters in particular embodiments. The brew chamber 110 and/or the coffee chamber 120 can have conical or partially conical shapes in certain embodiments, and can have other shapes (e.g., generally cylindrical shapes) in other embodiments. In particular embodiments, a pressure source or a vacuum source is used to produce the pressure differential of at least 60 torr between the brew chamber and the coffee chamber of the system. In other embodiments, the pressure source and the vacuum source can be activated simultaneously to produce the desired pressure differential. The first and second phases described above can be repeated once (as third and fourth phases), twice (as fifth and sixth phases) or more than twice.

The grinds can also have other dimensions in other embodiments. For example, in at least some embodiments for which the system produces brewed coffee via multiple extractions, the grind diameter can be larger than 600μ. In particular such embodiments, the grind diameter can range up to about 1000μ.

Certain aspects of the technology described in the context of the particular embodiments may be combined or eliminated in other embodiments. For example, the agitation device described above can be eliminated in particular embodiments. In some embodiments, the aspects of the brewing processes and systems described above in the context of an automated or partially automated arrangement can be conducted in a manual arrangement, and vice versa. Further, while advantages associated with certain embodiments of the technology have been described in the context of those embodiments, other embodiments may also exhibit such advantages, and not all embodiments need necessarily exhibit such advantages to fall within the scope of the present technology. Accordingly, the present disclosure and associated technology can encompass other embodiments not expressly shown or described herein.

We claim:

1. A method for brewing a beverage, comprising:
placing grounds on a filter element of a brew chamber;
directing a first volume of hot water into the brew chamber and in contact with the grounds;
activating a pressure differential device to extract a first beverage volume, formed from the first volume of water, out of the brew chamber, with a pressure differential of at least 60 torr between the brew chamber and an extraction chamber to which the brew chamber is coupled, the extraction chamber having a capacity of 200 mL or more, wherein the pressure differential device includes both a pressure source and a vacuum source;
directing a second volume of hot water into the brew chamber to contact the grounds; and
activating the pressure differential device to extract a second beverage volume, formed from the second volume of water, out of the brew chamber to mix, as is, with the first beverage volume in the extraction chamber.

2. The method of claim 1, further comprising:
directing at least a third volume of hot water into the brew chamber to contact the grounds; and
activating the pressure differential device to extract a third beverage volume, formed from the third volume of water, out of the brew chamber to mix, as is, with the first and second beverage volumes in the extraction chamber.

3. The method of claim 2, further comprising:
directing at least a fourth volume of hot water into the brew chamber to contact the grounds; and
activating the pressure differential device to extract a fourth beverage volume, formed from the fourth volume of water, out of the brew chamber to mix, as is, with the first, second, and third beverage volumes in the extraction chamber.

4. The method of claim 1 wherein activating the pressure differential device to extract one or both of the first and second beverage volumes includes activating the vacuum source, with the vacuum source coupled to the extraction chamber.

5. The method of claim 1 wherein activating the pressure differential device to extract one or both of the first and second beverage volumes includes activating the pressure source, with the pressure source coupled to the brew chamber.

6. The method of claim 1 wherein activating the pressure differential device to extract one or both of the first and second beverage volumes includes activating the pressure source in combination with activating the vacuum source.

7. The method of claim 6 wherein activating the pressure differential device includes activating the pressure source and the vacuum source simultaneously.

8. The method of claim 6 wherein activating the pressure differential device includes activating the pressure source and the vacuum source sequentially.

9. The method of claim 1 wherein the combined volume of the first beverage volume and the second beverage volume is one liter.

10. The method of claim 1 wherein at least one of the first beverage volume or the second beverage volume remains in the brew chamber for a period of from 5 seconds to 5 minutes before being extracted from the brew chamber.

11. A method for brewing a beverage, comprising:
placing grounds on a filter element of a brew chamber;
directing a first volume of hot water into the brew chamber and in contact with the grounds;
activating a pressure source to pressurize and extract a first beverage volume, formed from the first volume of water, out of the brew chamber, with a pressure differential in the range of about 60 torr to about 759.999999999 torr between the brew chamber and an extraction chamber to which the brew chamber is coupled, the extraction chamber having a capacity in the range of about 200 mL to about 12 liters;
directing a second volume of hot water into the brew chamber to contact the grounds; and
activating the pressure source to extract a second beverage volume, formed from the second volume of water, out of the brew chamber to mix, as is, with the first beverage volume in the extraction chamber.

12. The method of claim 11 wherein at least one of the first beverage volume or the second beverage volume remains in the brew chamber for a period of from 5 seconds to 5 minutes before being extracted from the brew chamber.

13. The method of claim 11 wherein extracting the first beverage volume is performed without applying a vacuum to the brew chamber.

14. The method of claim 11 wherein extracting the second beverage volume is performed without applying a vacuum to the brew chamber.

15. The method of claim 11 wherein the pressure differential has a value of at least one atmosphere.

16. The method of claim 11, further comprising agitating the grounds and at least one of the volumes of hot water while the at least one volume of hot water is in the brew chamber.

17. The method of claim 11 wherein the operations of placing the grounds, directing the volumes of hot water, and activating the pressure source are directed by an automated controller.

18. The method of claim 11 wherein at least one of the operations of placing the grounds, directing the volumes of hot water, and activating the pressure source is directed by an automated controller.

19. The method of claim 11 wherein at least one of the operations of placing the grounds, directing the volumes of hot water, and activating the pressure source is performed manually.

20. The method of claim 11 wherein the grounds include coffee grounds.

21. The method of claim 11 wherein directing the first volume of hot water includes directing the first volume of hot water onto dry grounds.

22. The method of claim 11 wherein directing the second volume of hot water includes directing the second volume of hot water onto an at least partially dried portion of the grounds.

* * * * *